United States Patent
Bohrer et al.

(10) Patent No.: US 8,340,509 B2
(45) Date of Patent: Dec. 25, 2012

(54) METHOD AND DEVICE FOR CONTROLLING PLAYING SPEED OF A COMPRESSED DIGITAL VIDEO SEQUENCE (TRICKMODE)

(75) Inventors: Roland Bohrer, Saint-Julien de Ratz (FR); Roselyne Haller, Brie et Angonnes (FR); Sebastien Leblanc, Fontaine (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 216 days.

(21) Appl. No.: 12/948,681

(22) Filed: Nov. 17, 2010

(65) Prior Publication Data
US 2011/0116773 A1    May 19, 2011

(30) Foreign Application Priority Data
Nov. 18, 2009    (FR) ..................... 09 05540

(51) Int. Cl.
*H04N 5/783* (2006.01)
*H04N 5/931* (2006.01)

(52) U.S. Cl. ........ 386/344; 386/345; 386/347; 386/350; 386/351; 386/206

(58) Field of Classification Search .................. 386/344, 386/345, 347, 350–351, 206
See application file for complete search history.

(56) References Cited

U.S. PATENT DOCUMENTS

| | | | |
|---|---|---|---|
| 5,740,307 A | 4/1998 | Lane | 386/68 |
| 6,654,539 B1* | 11/2003 | Duroz et al. | 386/343 |
| 2004/0001696 A1 | 1/2004 | Kogusuri | 386/68 |
| 2004/0067043 A1* | 4/2004 | Duruoz et al. | 386/68 |
| 2006/0098941 A1* | 5/2006 | Abe et al. | 386/52 |
| 2009/0037972 A1 | 2/2009 | Pontual et al. | 725/133 |
| 2009/0210778 A1* | 8/2009 | Kulas et al. | 715/201 |

* cited by examiner

*Primary Examiner* — Helen Shibru
(74) *Attorney, Agent, or Firm* — Seed IP Law Group PLLC

(57) ABSTRACT

A method of playing a compressed digital video sequence, comprising steps comprising attributing to each frame a display duration determined as a function of a playing speed set point, and at each period of a frame synchronization signal: if a display duration cumulative value is equal to or greater than a threshold value corresponding to the period of the synchronization signal, playing a previously acquired decoded frame and decreasing the cumulative value of the threshold value; and if the present cumulative value is less than the threshold value, acquiring a new decoded frame and adding the display duration attributed to the newly acquired frame to the cumulative value, until the cumulative value is equal to or greater than the threshold value, playing a last decoded frame acquired and decreasing the cumulative value of the threshold value.

32 Claims, 7 Drawing Sheets

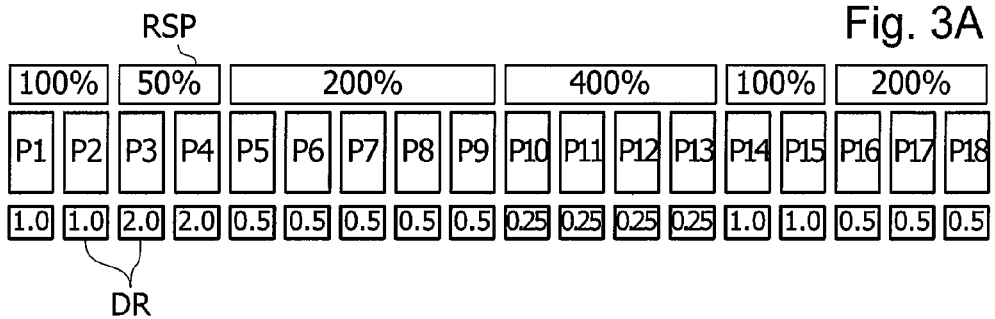
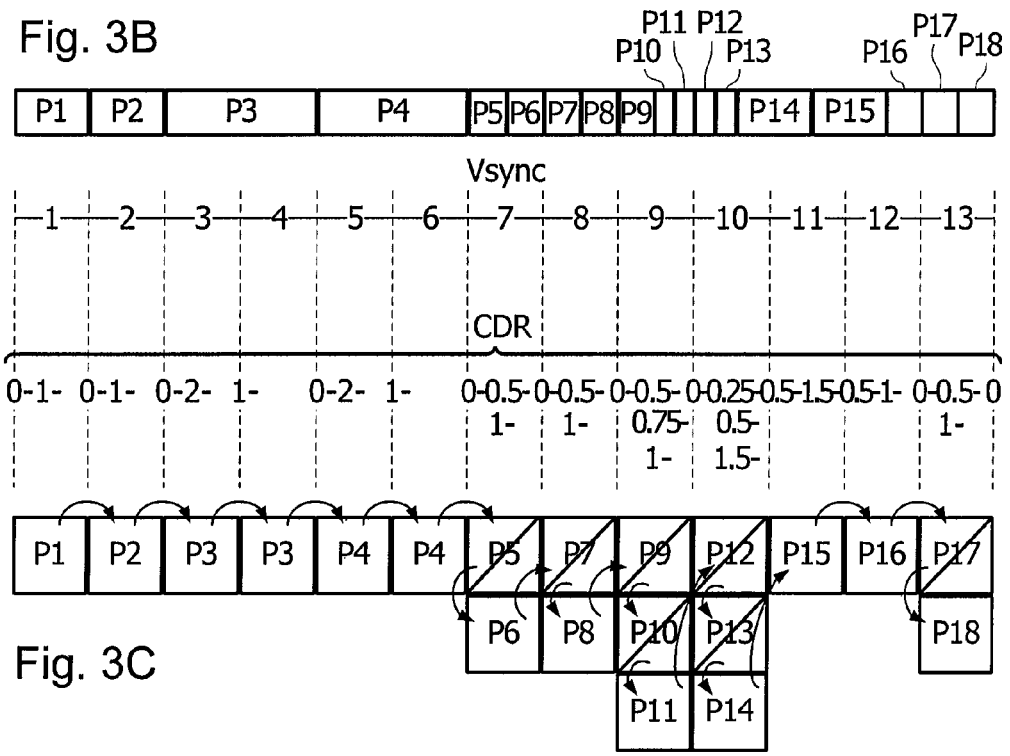

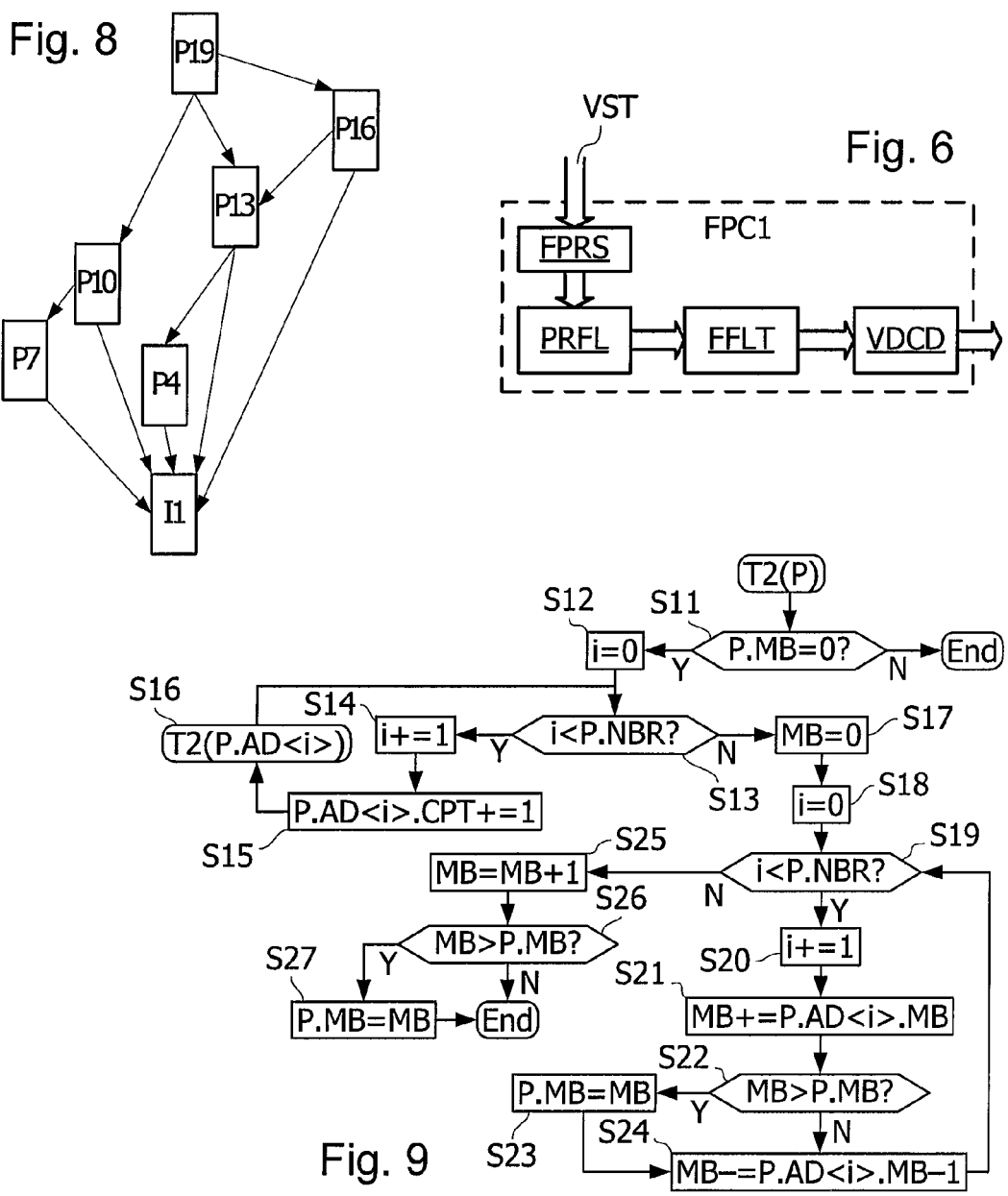

METHOD AND DEVICE FOR CONTROLLING PLAYING SPEED OF A COMPRESSED DIGITAL VIDEO SEQUENCE (TRICKMODE)

BACKGROUND

1. Technical Field

The present disclosure relates to the control of the playing speed of a compressed digital video sequence, such as an MPEG-2 or MPEG-4 format type sequence.

2. Description of the Related Art

The compression of a digital video sequence takes advantage of spatial and/or temporal information redundancy. Compressed video sequences generally comprise independent frames and dependant frames. An independent frame may be coded or decoded by using only the information from the frame itself. On the contrary, a dependant frame is coded or decoded by using the information from one or more other frames of the video sequence. In certain digital video compression formats, such as MPEG-2 and MPEG-4, the video sequence frames are organized in groups of frames with identical structures, comprising independent I-type frames, dependant P-type reference frames, and dependant B-type non-reference frames. An I-type frame is compressed by taking advantage of internal spatial redundancies of frame image blocks. Dependant P-type frames are formed by image blocks coded from a preceding I- or P-type frame in the group of frames. The B-type frames are formed from image blocks coded from a preceding or a following I- or P-type frame in the group of frames.

A video sequence may be played not only at a nominal speed, but also at other speeds that may be quicker or slower, or even negative if the sequence is played in reverse (in the reverse order of the filming). The playing of a video sequence at a speed other than the nominal speed is called "Trickmode". In this mode, various quality criteria may be defined. A speed precision criteria determines whether a speed set point is correctly attained. The speed precision may be measured by comparing the time passed and the duration to the nominal speed of the sequence played. A display fluidity criteria is relative to the loading rate of the displayed frames. Another criteria linked to the regularity of this loading rate is given by the variance of the loading rate per time unit. Another criteria is linked to the temporal distribution of displayed frames in a video sequence and may be measured by the variance of the loading rate per video sequence frame. Some of these criteria may be contradictory, such that a treatment optimization of a video sequence aiming to satisfy one or more criteria is only possible at the expense of one or more other criteria. It thus would be desirable to be able to choose upon the basis of which criteria this treatment is to be optimized for.

In general, a video sequence playing apparatus comprises a decoder that receives frames of a video sequence to decode. The decoder decodes all the received frames and increments a decoded frame counter each time a frame is decoded. As soon as the counter goes to 1, a decoded frame is transmitted to a display control device at a frame frequency. Each time that a frame is transmitted to the display control device, the frame counter is decremented. If the counter reaches 0, this signifies that the decoder is not able to decode all the frames at the frame frequency, and the display control device duplicates the last decoded frame. Moreover, to make up its delay, the decoder goes into a degraded mode wherein certain frames are not decoded. The non-decoded frames are chosen from the B-type frames first, then from the P-type frames, and finally from the I-type frames. It results that the distribution of displayed frames is not controlled, often resulting in oscillation effects on the video sequence playing speed.

Moreover, if the video sequence playing speed is modified while the counter is at a value greater than 1, the change of the playing speed cannot be taken into consideration as long as the decoded frames waiting to be played at the time of modification of the playing speed have not yet been played.

BRIEF SUMMARY

An embodiment relates to a method of playing a compressed digital video sequence, comprising steps of decoding frames of the sequence, and of playing the decoded frames as a function of a playing speed set point. According to one embodiment, the method comprises the steps of attributing to each frame a display duration determined as a function of the playing speed set point, and at each period of a frame synchronization signal: if a display duration cumulative value is equal to or greater than a threshold value corresponding to the period of the synchronization signal, playing a previously acquired decoded frame, and decreasing the cumulative value of the threshold value; and if the present cumulative value is less than the threshold value, acquiring a new decoded frame and adding the display duration attributed to the newly acquired frame to the cumulative value, until the cumulative value is equal to or greater than the threshold value, playing a last decoded frame acquired, and decreasing the cumulative value of the threshold value.

According to one embodiment, the method comprises, before the step of decoding frames of the sequence, a step of selecting, as a function of the playing speed set point, of video frames to play from among the video frames of the video sequence, and a step of re-evaluating the display duration attributed with each selected frame, so as to respect the playing speed set point.

According to one embodiment, the video sequence comprises independent frames, dependant reference frames, and dependant non-reference frames, the step of selecting video frames to play comprising selecting independent frames only or selecting independent frames and dependant reference frames only.

According to one embodiment, the video sequence comprises groups of frames of identical structures, and the method comprises steps of analyzing the structure of the groups of frames of the video sequence, and removing a frame selected to play if its decoding requires a temporary storage capacity greater than an available storage capacity.

According to one embodiment, the video sequence comprises groups of frames of identical structures, and the method comprises steps of analyzing the structure of the groups of frames of the video sequence, and of removing a frame selected to play if the decoding of selected frames of a group of frames requires a treatment capacity greater then an available treatment capacity.

According to one embodiment, the video sequence comprises groups of frames of identical structures, and the method comprises steps of evaluating a number of frames to store in order to decode a frame selected to play, and of suppressing the frame selected to play if its decoding requires the storage of a number of frames greater than an available storage capacity.

According to one embodiment, the video sequence comprises groups of frames of identical structures, and the method comprises steps of evaluating a number of frame decodings to perform in order to decode frames selected to play of the group of frames, and of removing a frame selected to play if the number of decodings to perform is greater than a decoding treatment capacity.

According to one embodiment, the method comprises a step of correcting display durations attributed to frames selected to play in order to equalize the frame display durations.

According to one embodiment, the video sequence comprises groups of frames of identical structures, and the method comprises steps of removing frames from among frames selected to play of a group of frames, to equalize a temporal playing of frames selected to play.

An embodiment acts in real-time on the video sequence playing speed. An embodiment favors certain of the above-described criteria in order to improve the playing quality of a video sequence no matter what the playing speed is. An embodiment selects frames to decode if the decoding and the temporary storage resources are insufficient due to a too fast playing speed and/or the coexistence of other decoding processes occupying these resources. An embodiment manages a service quality by dividing the calculation and temporary storage resources between several decoding processes, for example as a function of the priority level.

Moreover, when, for example, the playing speed is essentially comprised, for example, between 0.5 and 2 times the nominal speed, an embodiment plays the sound while respecting the image-sound synchronization.

An embodiment relates to a playing device of a sequence of compressed digital video frames, comprising a video frame decoding module to decode a video frame. According to one embodiment, the device is configured to implement embodiments of the methods described above.

In an embodiment, a method comprises: decoding frames of a compressed digital video sequence and playing the decoded frames as a function of a playing speed set point, by: attributing to each frame a display duration determined as a function of the playing speed set point; and at each period of a frame synchronization signal: if a display duration cumulative value is equal to or greater than a threshold value corresponding to the period of the synchronization signal, playing a previously acquired decoded frame and decreasing the display duration cumulative value; and if the display duration cumulative value is less than the threshold value, acquiring a new decoded frame and adding the display duration attributed to the newly acquired frame to the display duration cumulative value until the cumulative value is equal to or greater than the threshold value, playing a last decoded frame acquired, and decreasing the cumulative value of the threshold value. In an embodiment, the method further comprises, before decoding frames of the sequence, selecting video frames to play from among video frames of the video sequence as a function of the playing speed set point, and reevaluating the display duration attributed with each selected frame, as a function of the playing speed set point. In an embodiment, the video sequence comprises independent frames, dependant reference frames, and dependant non-reference frames, wherein selecting video frames to play comprises selecting independent frames only or selecting independent frames and dependant reference frames only. In an embodiment, the video sequence comprises groups of frames of identical structures, the method comprising analyzing the structure of the groups of frames of the video sequence, and removing a frame selected to play if decoding of the frame requires a temporary storage capacity greater than an available storage capacity. In an embodiment, the video sequence comprises groups of frames of identical structures, the method comprising analyzing the structure of the groups of frames of the video sequence, and of removing a frame selected to play if the decoding of selected frames of a group of frames requires a treatment capacity greater than an available treatment capacity. In an embodiment, the video sequence comprises groups of frames of identical structures, the method comprising evaluating a number of frames to store in order to decode a frame selected to play, and of suppressing the frame selected to play if decoding of the frame selected to play requires storage of a number of frames greater than an available storage capacity. In an embodiment, the video sequence comprises groups of frames of identical structures, the method comprising evaluating a number of frame decodings to perform in order to decode frames selected to play of the group of frames, and of removing a frame selected to play if the number of decodings to perform to decode the frame selected to play is greater than a decoding treatment capacity. In an embodiment, the method comprises adjusting display durations attributed to frames selected to play to equalize frame display durations. In an embodiment, the video sequence comprises groups of frames of identical structures, the method comprising removing frames from among frames selected to play of a group of frames, to equalize a temporal playing of frames selected to play.

In an embodiment, a digital video player comprises: a playing speed control module configured to generate signals to control a playing speed; a decoder configured to decode frames of a compressed digital video sequence; and a display control module, wherein the player is configured to attribute to each frame a display duration determined as a function of the playing speed set point; and at each period of a frame synchronization signal: if a display duration cumulative value is equal to or greater than a threshold value corresponding to the period of the synchronization signal, output a previously acquired decoded frame and decrease the display duration cumulative value; and if the display duration cumulative value is less than the threshold value: acquire new decoded frames and add the display duration attributed to the newly acquired frames to the display duration cumulative value until the cumulative value is equal to or greater than the threshold value; output a last decoded frame acquired; and decrease the cumulative value of the threshold value. In an embodiment, the digital video player further comprises: a filter coupled to an input of the decoder and configured to: select video frames to play from among video frames of the video sequence as a function of the playing speed set point. In an embodiment, the player is configured to reevaluate the display duration attributed with each selected frame, as a function of the playing speed set point. In an embodiment, the video sequence comprises independent frames, dependant reference frames, and dependant non-reference frames, and the filter is configured to select video frames to play from independent frames only or from independent frames and dependant reference frames only. In an embodiment, the video sequence comprises groups of frames of identical structures and the filter is configured to analyze the structure of the groups of frames of the video sequence and remove a frame selected to play if decoding of the frame requires a temporary storage capacity greater than an available storage capacity. In an embodiment, the video sequence comprises groups of frames of identical structures and the filter is configured to analyze the structure of the groups of frames of the video sequence and remove a frame selected to play if the decoding of selected frames of a group of frames requires a treatment capacity greater than an available treatment capacity. In an embodiment, the video sequence comprises groups of frames of identical structures and the filter is configured to evaluate a number of frames to store to decode a frame selected to play and suppress the frame selected to play if decoding of the frame selected to play requires storage of a number of frames greater than an available storage capacity. In an embodiment, the video sequence comprises groups of frames of identical structures and the filter is configured to evaluate a number of frame decodings to perform to decode frames selected to play of the group of frames and remove a frame selected to play if the number of frame decodings to perform to decode the frame selected to play is greater than a decoding treatment capacity. In an embodiment, the player is configured to adjust display durations attributed to frames selected to play to equalize frame display durations. In an embodiment, the video sequence comprises groups of frames of identical structures and the filter is configured to remove frames from among frames selected to play of a group of frames, to equalize a temporal playing of frames selected to play.

In an embodiment, a system comprises: means for decoding frames of a compressed digital video sequence; means for attributing to frames a display duration based on a playing speed set point; and means for, at each period of a frame synchronization signal: if a display duration cumulative value is equal to or greater than a threshold value corresponding to the period of the synchronization signal, outputting a previously acquired decoded frame and decreasing the display duration cumulative value; and if the display duration cumulative value is less than the threshold value: acquiring new decoded frames and adding the display duration attributed to the newly acquired frames to the display duration cumulative value until the cumulative value is equal to or greater than the threshold value; outputting a last decoded frame acquired; and decreasing the cumulative value of the threshold value. In an embodiment, the system further comprises: means for selecting video frames to play from among video frames of the video sequence as a function of the playing speed set point. In an embodiment, the system further comprises: means for reevaluating the display duration attributed with each selected frame, as a function of the playing speed set point. In an embodiment, the video sequence comprises independent frames, dependant reference frames, and dependant non-reference frames, and the means for selecting is configured to select video frames to play from independent frames only or from independent frames and dependant reference frames only. In an embodiment, the video sequence comprises groups of frames of identical structures, and the system further comprises: means for analyzing the structure of the groups of frames of the video sequence and selectively removing a frame selected to play. In an embodiment, the system further comprises: means for adjusting display durations attributed to frames selected to play to equalize frame display durations. In an embodiment, the system further comprises: means for playing decoded video sequences.

In an embodiment, a non-transitory computer readable medium's contents cause at least one processing device to perform a method, the method comprising: decoding frames of a compressed digital video sequence; attributing to frames a display duration based on a playing speed set point; and, at each period of a frame synchronization signal: if a display duration cumulative value is equal to or greater than a threshold value corresponding to the period of the synchronization signal, outputting a previously acquired decoded frame and decreasing the display duration cumulative value; and if the display duration cumulative value is less than the threshold value: acquiring new decoded frames and adding the display duration attributed to the newly acquired frames to the display duration cumulative value until the cumulative value is equal to or greater than the threshold value; outputting a last decoded frame acquired; and decreasing the cumulative value of the threshold value. In an embodiment, the method further comprises: selecting video frames to play from among video frames of the video sequence as a function of the playing speed set point. In an embodiment, the method further comprises: reevaluating the display duration attributed with each selected frame, as a function of the playing speed set point. In an embodiment, the video sequence comprises independent frames, dependant reference frames, and dependant non-reference frames and the selecting comprises selecting video frames to play from independent frames only or from independent frames and dependant reference frames only. In an embodiment, the video sequence comprises groups of frames of identical structures, and the method further comprises: analyzing the structure of the groups of frames of the video sequence and selectively removing a frame selected to play based on the analysis. In an embodiment, the method further comprises: adjusting display durations attributed to frames selected to play to equalize frame display durations.

BRIEF DESCRIPTION OF THE SEVERAL VIEWS OF THE DRAWINGS

Embodiments of the disclosure will be described in the following description, in a non-limiting manner in relation with the appended figures wherein:

FIGS. 3A, 3B, and 3C show frames of a video sequence at different treatment steps, to illustrate the functioning of the display control device shown in FIG. 2;

FIG. 6 shows schematically an embodiment of a decoded video frame generation module of a video sequence playing device;

FIG. 7 shows a data structure of a video sequence;

FIG. 8 shows a frame decoding dependency tree of a group of frames of a video sequence;

FIGS. 9 to 11 show sequences of steps performed by a decoded video frame generation module, according to one embodiment;

DETAILED DESCRIPTION

Figure 1:
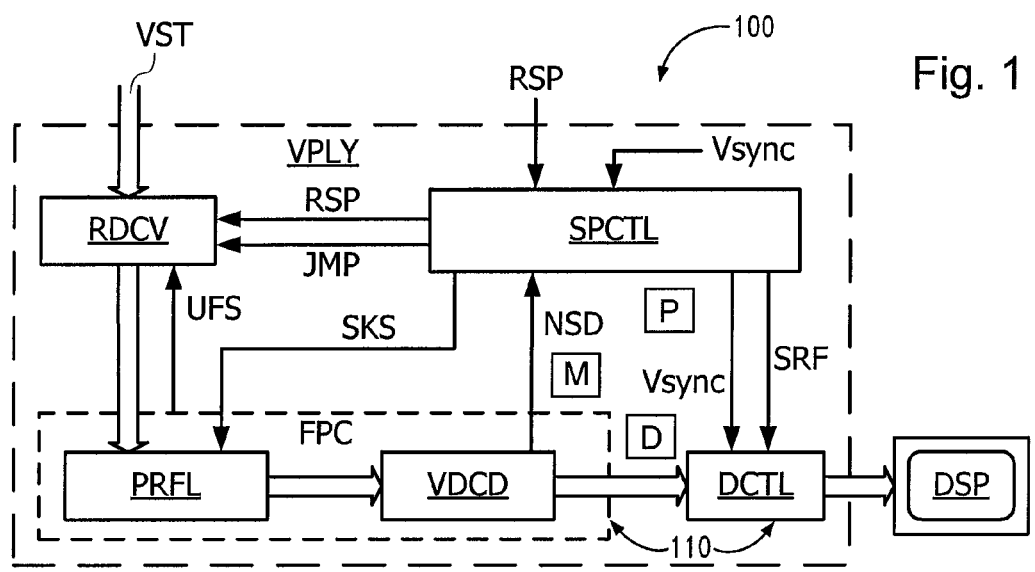
FIG. 1 shows schematically a video sequence playing device, according to one embodiment.

In the following description, certain details are set forth in order to provide a thorough understanding of various embodiments of devices, methods and articles. However, one of skill in the art will understand that other embodiments may be practiced without these details. In other instances, well-known structures and methods associated with, for example, decoders and displays, have not been shown or described in detail in some figures to avoid unnecessarily obscuring descriptions of the embodiments.

Unless the context requires otherwise, throughout the specification and claims which follow, the word "comprise"

and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure or the claims.

The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not necessarily intended to convey any information regarding the actual shape of particular elements, and have been selected solely for ease of recognition in the drawings.

FIG. 1 shows a system 100 comprising a video sequence playing device VPLY and a display DSP. The video sequence playing device VPLY comprises a video frame reception module RDCV, a decoded video frame generation module FPC, a display control module DCTL, and a playing speed control module SPCTL. The module RDCV receives a flow of video frames VST and transmits them to the module FPC. The module RDCV receives from the module FPC a capacity overflow signal UFS when the module FPC estimates that the video frame transmission rate is insufficient. The module RDCV may also receive from the module SPCTL a jump signal JMP to launch a video sequence jump in the video frames transmitted to the module FPC.

The module FPC comprises a video frame decoding module VDCD configured to decode the video frames supplied by the module RDCV and to transmit the decoded video frames to the module DCTL. The module VDCD transmits signals NSD, indicating each time that a new video frame has been decoded or jumped, to the module SPCTL. The module VDCD is adapted in a conventional manner to the compression format of video frames received by the device VPLY.

The module DCTL receives, at the frame display frequency of the display device DSP, the decoded video frames and a frame display synchronization signal Vsync. At each pulse of the signal Vsync, the module DCTL supplies to the display device DSP a decoded video frame so that it may be displayed.

The module SPCTL is configured to ensure the control and the synchronization of other modules of the device VPLY, as a function of a playing speed set point RSP and the signals NSD supplied by the module VDCD. In particular, the module SPCTL keeps up-to-date a number of frames treated by the module FPC as a function of the signals NSD and calculates the effective playing speed of the video sequence. If this effective speed differs too greatly from a set point speed, the module SPCTL sends to the module DCTL a signal SRF forcing a duplication or a deletion of a frame during the transmission of the decoded video sequence to the display device DSP.

According to one embodiment, the module RDCV is configured to attribute information relative to a display duration, determined as a function of the playing speed set point RSP received by the module SPCTL, to each received video frame. The module DCTL is thus configured to control the display of a video frame decoded as a function of the display duration associated with the frame, that is to say to transmit a new decoded video frame, to retransmit a previously transmitted video frame, or not to transmit a decoded video frame, to the display device DSP. In this manner, a playing speed set point may be acted upon in real time.

As illustrated, the system 100 comprises one or more processors P, one or more memories M, and one or more discrete components D, which may be configured in various combinations to implement one or more of the modules of the system 100. Although illustrated as separate modules, the various modules may be combined in some embodiments. For example, the modules FPC and DCTL may be combined into a decode and display control module 110 in some embodiments.

Figure 2:
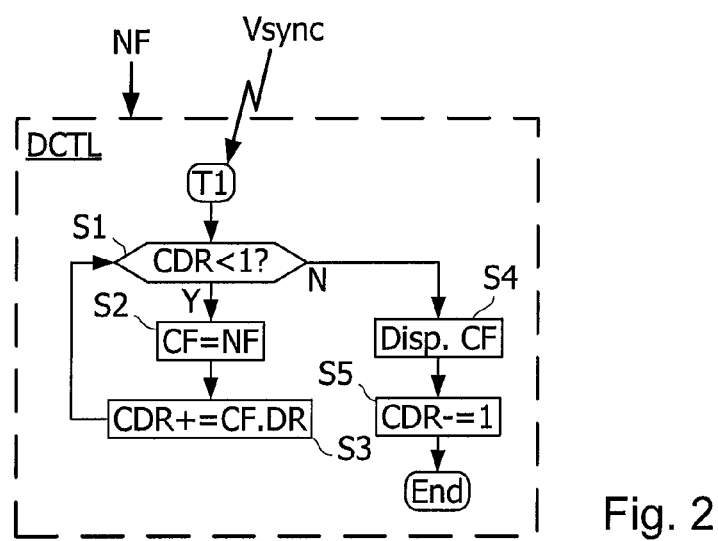
FIG. 2 shows a sequence of steps performed by a display control device of the video sequence playing device, according to one embodiment.

FIG. 2 shows a sequence of steps executed by the module DCTL and launched at each pulse of the synchronization signal Vsync. In FIG. 2, the sequence of steps T1 comprises steps S1 to S5. At step S1, the value of a counter CDR representing an accumulation of display duration is compared to a threshold value corresponding to the duration of a period of the signal Vsync, that is for example the value 1. If the counter CDR has a value greater than or equal to the threshold value, the module DCT performs steps S4 and S5 to again display a decoded frame acquired and displayed during the previous period of the signal Vsync and to decrement the value of the threshold value counter, otherwise it executes steps S2 and S3 to acquire a new decoded frame to display and to add the display duration of the new frame to the counter CDR value, until the counter reaches or exceeds the threshold value. Thus, at step S2, a new frame NF received by the module DCTL is loaded in a buffer memory CF. At step S3, the counter CDR is incremented with the display duration DR associated with the frame loaded in the memory CF. The execution of the sequence T1 is then continued from step S1. If at step S2, the counter CDR is greater than or equal to 1, the module DCTL performs steps S4 and S5 to transmit the frame contained in the memory CF to the display device DSP and to decrement the counter CDR by 1. However, if the counter CDR is still less than 1, steps S2 and S3 are again performed, which signifies that the frame in the memory CF is replaced by a following frame NF in the video sequence to display, without the frame in the memory having been transmitted to the device DSP.

FIGS. 3A, 3B, and 3C show a sequence of video frames P1 to P18. FIG. 3A shows the sequence P1-P18 on input of the module DCTL. The sequence P1-P18 comprises several sequence portions that received different playing speed set points RSP. Thus the frames P1 and P2 received a speed set point equal to 100%, which signifies that these frames are to be displayed at the nominal speed. The frames P3 and P4 received a speed set point RSP equal to 50%, i.e., half of the nominal speed. The sequence portion comprising the frames P5 to P9 received a speed set point RSP equal to 200%, i.e., twice the nominal speed. The sequence portion comprising the frames P10 to P13 received a speed set point RSP equal to 400%, i.e., four times the nominal speed. The frames P14 and P15 received the speed set point 100%, and the frames P16 to P18 received the speed set point 200%. FIG. 3A also indicates the display duration DR value attributed to each frame P1 to P18 as a function of the speed set point RSP (equal to the inverse of the speed set point). Thus, a playing speed set point RSP of 100% corresponds to a display duration DR equal to 1, a speed set point of 50% to a display duration equal to 2, a speed set point of 200% to a display duration equal to 0.5, and a speed set point of 400% to a display duration equal to 0.25.

FIG. 3B shows the sequence of video frames P1-P18 placed in a temporal ladder having as unit the frame display duration, that is, the period of the synchronization signal frame Vsync. Thus, each frame P1-P18 is presented in FIG. 3B with a width corresponding to the display duration DR that is associated with it, a frame associated with a display duration equal to 1 having a length corresponding to the period of the signal Vsync.

FIG. 3C shows the sequence of video frames P1-P18 on output of the module DCTL, in conformance with the execution of the sequence T1. In FIG. 3C, the frames are placed in the same temporal ladder, certain frames being crossed out to indicate that they are not transmitted to the display device DSP. FIG. 3C also indicates the value of the counter CDR. It appears that when the different playing speed set point RSP values are taken into consideration, only the frames P1-P4, P6, P8, P11, P14-P16, and P18 are displayed, the frames P3 and P4 being displayed during two periods of the signal Vsync to take their display durations equal to 2 into account.

Following the transmission of frames P1 and P2 to the display device DSP (during periods 1 and 2 of the signal Vsync in FIG. 3C), the counter CDR goes from 0 to 1 (step S3), then is decremented by 1 (step S5). It results that the frames P1 and P2 are displayed during a period of the signal Vsync (step S5). Following the transmission of the frame P3 to the display device DSP (at period 3 of the signal Vsync in FIG. 3C), the counter CDR was incremented by 2 (step S3), then decremented by 1 (step S5), and at period 4 is still equal to 1. It results that the frame P3 is transmitted twice to the device DSP (step S4). This treatment is repeated with the frame P4. During the treatment of the frame P5 (at period 7 of the signal Vsync), the counter CDR that went to 0 (at step S1), is incremented by 0.5 (step S3). It results that the frame P5 is not displayed (return to step S1). The frame P6 is loaded in the memory CF, and the counter CDR is incremented by 0.5 and thus reaches the value 1. The frame P6 is therefore displayed. This treatment is repeated with the frames P7 and P8. At period 9 of the signal Vsync, the frame P9 is loaded in the memory CF, and the counter CDR at 0 is incremented by 0.5 (step S3), and the frame P9 is therefore not displayed. The frame P10 is then loaded in the memory CF, and the counter CDR is incremented by 0.25 to reach the value 0.75. As the counter CDR has not reached the value 1, the frame P10 is also not displayed. The frame P11 is then loaded in the memory CF and the counter is incremented by 0.25 to reach the value 1. The frame P11 is then displayed. At period 10 of signal Vsync, the counter CDR goes back to 0 and the treatment described above is repeated with the frames P12 to P14, but with different display durations. Thus the counter CDR goes to 0 with the frame P12, then to 0.5 with the frame P13, and to 1.5 with the frame P14. The frames P12 and P13 are therefore not displayed, whereas the frame P14 is displayed. At period 11 of the signal Vsync, the counter CDR is decremented by 1 to go to 0.5. The frame P14 is therefore not displayed again, and the following frame P15 is loaded in the memory CF. The counter CDR is then incremented to reach the value 1.5, and the frame P15 is then displayed. At period 12 of the signal Vsync, the counter CDR is decremented by 1 to go to 0.5. The frame P15 is therefore not displayed again. The following frame P16 is loaded in the memory CF and the counter is incremented to reach the value 1, and the frame P16 is then displayed. At period 13 of the signal Vsync, the counter CDR has been decremented by 1 to go to 0. The frames P17 and P18 are treated in the same manner as the frames P5 and P6 at period 7 of signal Vsync, and only the frame P18 is displayed.

According to one embodiment, the module FPC comprises a pre-filter module PRFL configured to select video frames to play from among the video frames received from the module RDCV, as a function of the display duration attributed to each frame. The module PRFL may be activated for example if the decoding treatment capacity of the frames and/or the temporary storage capacity is insufficient to decode all the frames.

The treatment applied by the module PRFL may comprise selecting by marking the frames to display as a function of the display duration associated with each frame, and of recalculating the display duration associated with each conserved frame, in a manner such that the playing speed of the sequence remains close to the speed set point. For example, each conserved frame may be attributed with a display duration equal to the initial display duration DR of the frame, to which the display durations attributed to adjacent frames (preceding or following) that were not conserved are added.

Figure 4A:
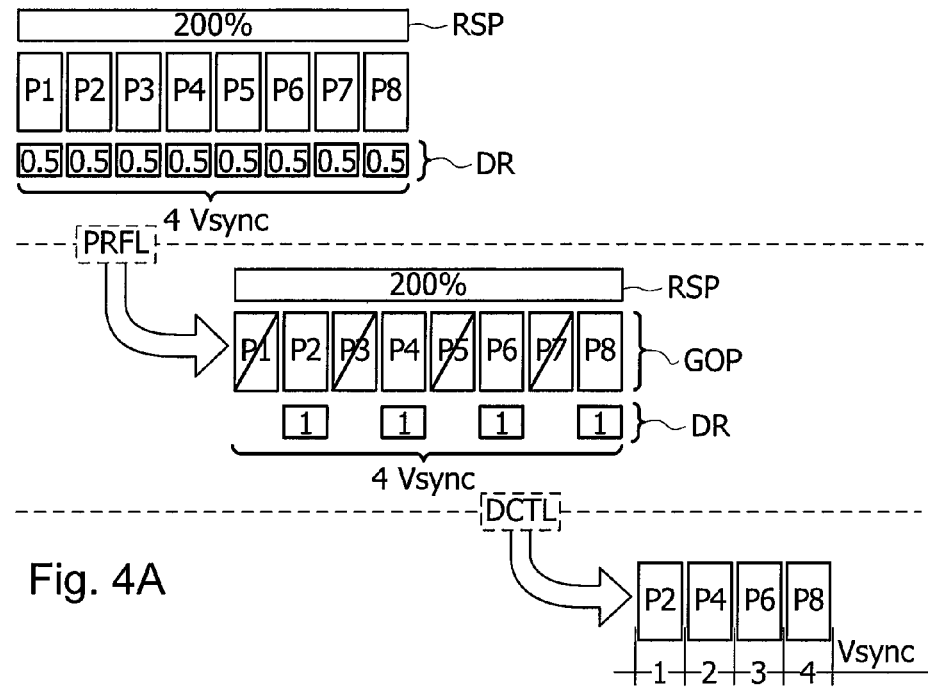
FIGS. 4A, 4B show video sequence frames at different treatment steps, to illustrate the functioning of a decoded video frame generation module of the video sequence playing device, according to one embodiment.
Figure 4B:
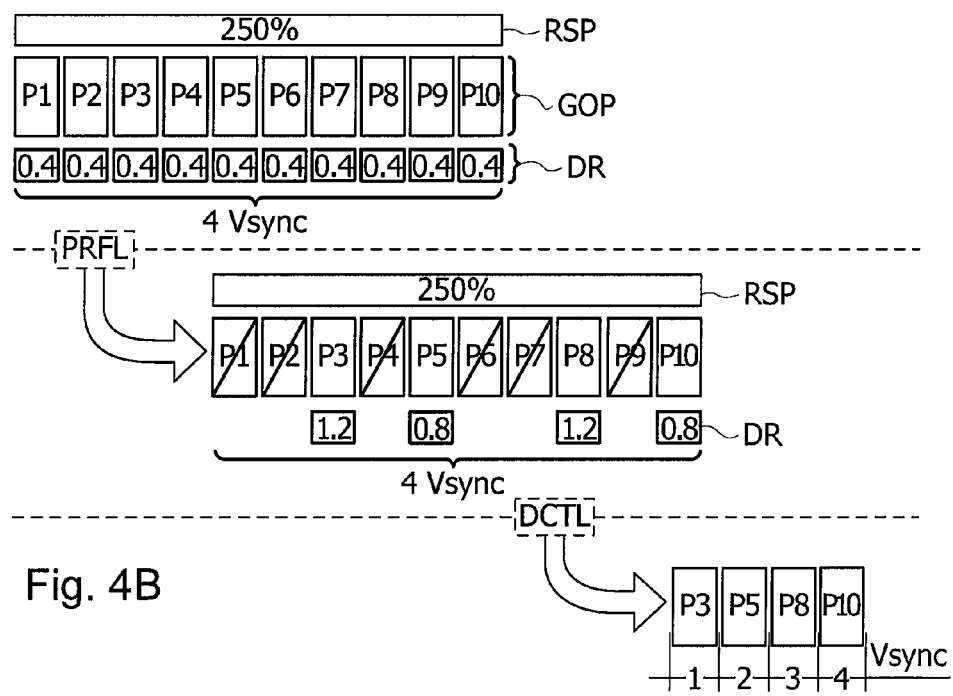

FIGS. 4A and 4B show sequences of video frames on input and output of the pre-filter module PRFL, and on output of the module DCTL. In FIG. 4A, the video sequence comprises eight frames numbered P1 to P8. A playing speed set point of 200% (of the nominal playing speed) is attributed to this sequence. Each frame is therefore associated with a display duration DR of 0.5 (times the period of the frame synchronization signal Vsync). The video sequence is thus displayed over 4 periods of the signal Vsync. The filtering treatment applied to the video sequence by the module PRFL comprises a step of selecting for display one out of two frames of the video sequence. Thus, only the frames P2, P4, P6, and P8 are marked as conserved in the sequence. The module PRFL also recalculates the display duration DR associated with each conserved frame marked to maintain the display duration of the sequence over 4 periods of the signal Vsync. Thus, the display duration of a conserved frame can be calculated by adding the display duration of the non-selected adjacent frame(s), preceding or following the conserved frame, to the initial display duration of the conserved frame. In the example of FIG. 4A, each marked conserved frame P2, P4, P6, P8 is associated with a display duration of 1 (one period of the signal Vsync), resulting from the sum of initial duration of the conserved frame and of the initial duration of the preceding or following non-conserved frame. The conserved frames are treated by the decoding module VDCD, then transmitted to the module DCTL, which transmits to the display device one decoded frame per period of the signal Vsync, without performing a duplication or a suppression of frames. Nevertheless, the decoding of certain conserved frames may require the decoding of one or more non-conserved frames. In this case, the module VDCD also proceeds with necessary decodings of non-conserved frames.

In FIG. 4B, the video sequence comprises ten frames numbered P1 to P10. This sequence is attributed with a playing speed set point of 250%. Each frame is therefore associated with a display duration of 0.4. The video sequence is therefore displayed over 4 periods of the signal Vsync. The filtering treatment applied to the frame by the module PRFL comprises a step of selecting for display two out of five frames of the video sequence. Thus, only the frames P3, P5, P8, and P10 of the sequence are marked for display. The module PRFL also recalculates the display duration associated with each marked frame to maintain the display duration of the sequence at 4 periods of the signal Vsync. Thus, the marked frames P3 and P8 are associated with a display duration DR equal to 1.2. The display duration of the frame P3 is equal to the sum of the initial display durations of frames P1, P2, and P3, and the display duration of the frame P8 is equal to the sum of the initial display durations of frames P6, P7, and P8. The frames P5 and P10 have a display duration DR of 0.8 resulting from the sum of the initial display durations of frames P4 and P5, and of the sum of the initial durations of frames P9 and P10. The marked frames are treated by the decoding module VDCD, then transmitted to the module DCTL, which transmits to the display device DSP one decoded frame per period of the signal Vsync, without performing a frame duplication or suppression. In FIGS. 4A and 4B, the filtering treatment done by the module PRFL is performed so as to only mark the frames to display. In this way, the module VDCD only has to decode the frames that will be displayed.

Figure 5A:
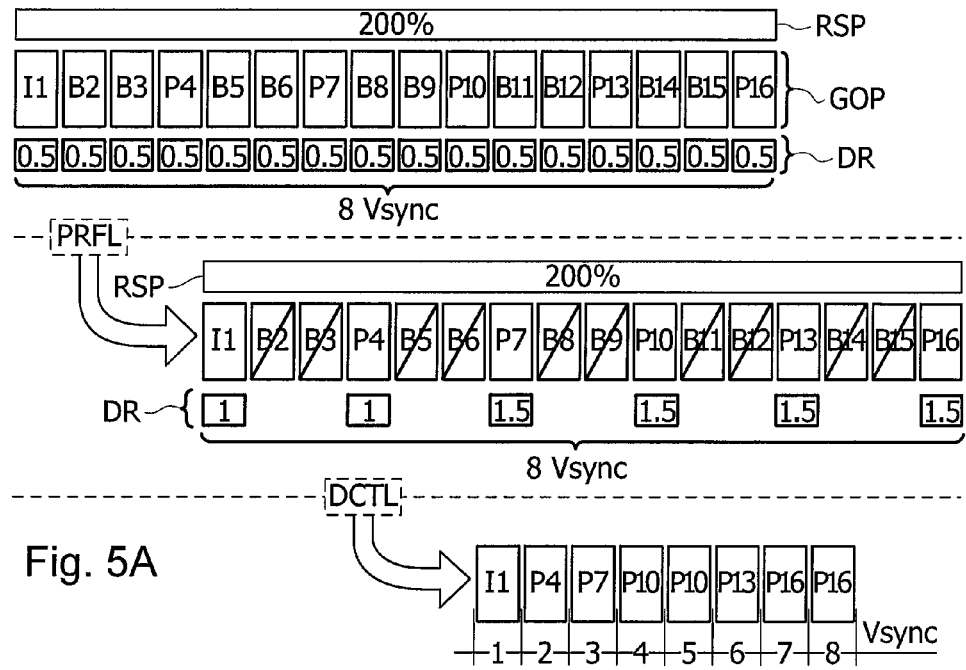
FIGS. 5A, 5B show video sequence frames at different treatment steps, to illustrate the functioning of the decoded video frame generation module, according to one embodiment.
Figure 5B:
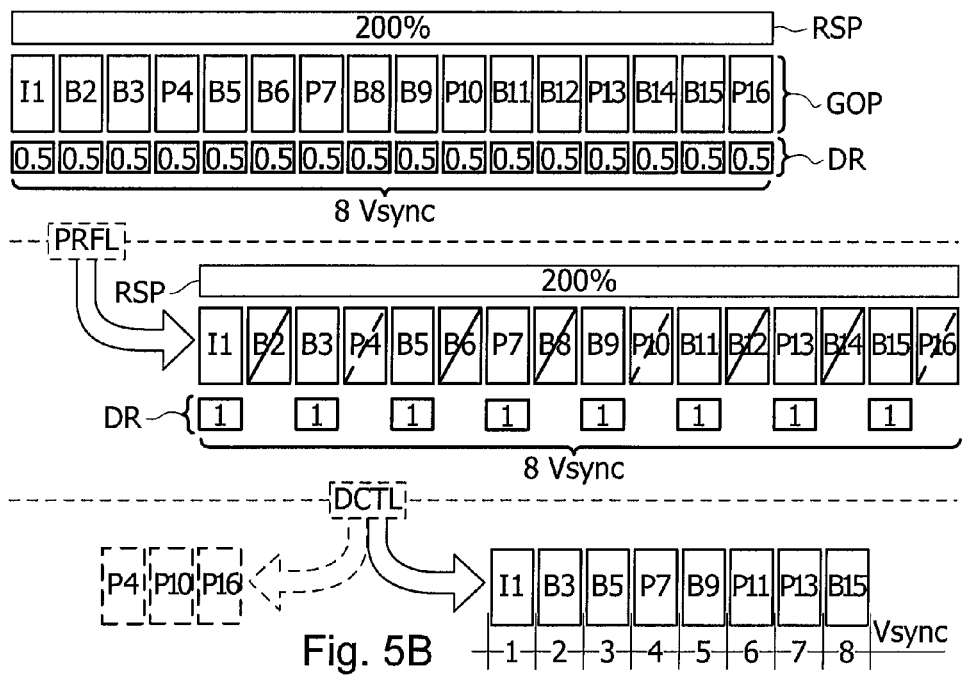

FIGS. 5A and 5B show sequences of video frames on input and output of the pre-filter module PRFL, and on output of the module DCTL. FIGS. 5A and 5B show the case where the frames of the video sequence to decode and to display undergo different decoding treatments according to the position of the frame in the sequence. Therefore, in FIG. 5A, the video sequence comprises a repetitive group GOP of 16 frames numbered I1 to P16, with one I-type independent frame and P- and B-type dependant frames. The I-type frame, numbered I1, is compressed by taking advantage of spatial redundancies of image blocks in the frame. The P-type frames, numbered P4, P7, P10, P13, and P16 are formed of image blocks coded from previous I- or P-type frame in the video sequence. The B-type frames, numbered B2, B3, B5, B6, B8, B9, B11, B12, B14, and B15 are formed from image blocks coded from a previous I- or P-type frame and from a following I- or P-type frame.

The treatment applied by the module PRFL may comprise the marking of frames to display as a function of their type. Thus, in FIG. 5A, the filtering treatment applied by the module PRFL comprises the marking of all the I- and P-type frames, with the exclusion of all the B-type frames, taking into consideration a playing speed set point of 200%. At the input of the module PRFL, all the frames I1-P16 of the sequence are associated with a display duration of 0.5 (times the period of the signal Vsync). On output of the module PRFL, none of the B-type frames are marked for display, and the display duration of each I- or P-type frame marked for display has been modified so as to conserve the total display duration of the sequence initially displayed over 8 periods of the signal Vsync, taking into consideration the number of frames of the sequence and the playing speed set point. Thus, the frames I1 and P4 are associated with a display duration DR equal to 1, and the frames P7, P10, P13, and P16 to a display duration DR equal to 1.5. The frames marked for display are treated by the module VDCD, then transmitted to the module DCTL. On output of the module DCTL, the frames P10 and P16 are each duplicated one time, whereas the other frames appear only one time, in conformance with the display duration associated with each frame and with the sequence of steps T1 shown in FIG. 2.

As the frame I1 immediately follows a frame P16 selected to be displayed from a preceding group of frames GOP, a display duration of 0.5 is attributed to the frame I1, and a duration of 1.5 is attributed to the frame P4. It results that the frame I1 is not displayed and the frame P4 is displayed twice, taking into consideration the sequence of steps T1. For a better fluidity during the display of the sequence, the duration DR of frames I1 and P4 may be corrected to 1 for each of these two frames, as shown in FIG. 5A.

In FIG. 5B, the treatment applied by the module PRFL only applies the speed set point RSP as a filtering criteria, and does not consider the types (I, P, or B) of the frames in the video sequence. The playing speed set point is fixed at 200%. The 16 frames of the video sequence I1-P16 are to be displayed over 8 periods of the signal Vsync. The module PRFL applies to the sequence a treatment comprising only marking for display one out of two frames of the sequence, and of associating with each marked frame a display duration equal to 1. Among the frames marked for display are the frames I1, B3, B5, P7, B9, B11, P13, and B15; the frame B5 can only be decoded with the help of frames P4 and P7, the frame B9 can only be decoded with the help of frames P7 and P10, and the frame B15 can only be decoded with the help of frames P13 and P16. As the frames P4, P10, and P16 were not marked, they also will be treated by the module VDCD. In comparison with the filtering mode shown in FIG. 5A, the filtering mode shown in FIG. 5B has the advantages of not requiring the analysis of the video frame structure in order to determine the respective placements of different types of frames, and of respecting the fluidity and regularity criteria as far as the playing of the video sequence is concerned. On the other hand, this filtering mode requires greater calculation power and temporary storage for the decoding module VDCD, because 3 additional frames out of 16 are to be decoded.

In the case where the filtering treatment done by the module PRFL is applied to a video sequence of which the frames receive different decoding treatments according to their positions in a repetitive group of frames GOP (from one I-type frame until the next I-type frame) of the sequence, the decoded video frame generation module can be modified as shown in FIG. 6, which shows a module FPC1 that differs from the module FPC shown in FIG. 1 in that it comprises a video sequence structure analysis module FPRS placed upstream of the module PRFL, and a final filtering module FFLT interposed between the module PRFL and the module VDCD.

The module FPRS analyzes the video sequence received to obtain information concerning a data structure that describes the characteristics of a group of frames GOP of the video sequence. An example of such a structure is shown in FIG. 7. This data structure comprises, for a group of frames GOP, the following data:
  number of frames NbT of the group of frames GOP,
  number of I-type frame to decode NbI in the group of frames,
  number of P-type frames to decode NbP in the group of frames,
  number of B-type frames to decode NbB in the group of frames, and
  a data structure SP1, SP2, . . . SPn for each frame of the group of frames, n being the number of frames in the group of frames.

Each data structure SP1-SPn comprises, per frame, the following data:
  address of the frame ADT in the group of frames,
  type TYP of frame (I, P, or B),
  number NBR of frames necessary for the decoding of the frame,
  addresses AD1, AD2, . . . ADp of all the frames necessary for the decoding of the frame, p being the number of reference frames stored in the field NBR,
  selection indicator SEL for the frame display,
  reference counter CPT indicating how many frames use this frame for their decoding, and
  maximum number MB of frames to store, in the worst case, for the decoding of the frame.

The address fields AD1-ADp of the frames necessary for the decoding of a frame define a frame dependency tree, an example of which is shown in FIG. 8, from among the reference frames (I- or P-type). This tree relates to a group of frames GOP having reference frames I1, P4, P7, P10, P13, P16, and P19. The frame P19 is linked to the frames P10, P13, and P16, which signifies that the decoding of the frame 19 may be carried out from decoded frames P10, P13, and P16. The frame P16 may be decoded from decoded frames I1 and P13. The frame P13 may be decoded from decoded frames I1 and P4. The frame P10 may be decoded from decoded frames I1 and P7. The frames P7 and P4 may be decoded from the decoded frame I1.

The module FFLT is configured to analyze the structure of the group of frames GOP, determined by the module FPRS, and if necessary to delete frames to display as a function of the treatment capacities attributed to the module VDCD, in terms of the memory capacity available to temporarily store decoded frames, and the number of frame decodings to perform in order to display the selected frames of a group GOP, considering the playing speed set point RSP.

FIG. 9 shows a sequence of steps T2 executed by the module FFLT for a frame P of a group of frames GOP. The sequence T2 allows for the determination of the field P.MB value of the frame P, that is to say the maximum number of frames to temporarily store in order to carry out the decoding of the frame P. The sequence T2 comprises steps S11 to S27. At step S11, the module FFLT tests whether the field P.MB of the frame P is at 0 or not. If the field MB is other than 0, this signifies that its value has already been calculated and the sequence T2 finishes. If the field P.MB is at 0, steps S12 and S13 are carried out. At step S12, an index i is initialized at 0. At step S13, the index i is compared to the field P.NBR value of the frame P (the number of frames upon which the decoding of the frame P depends). If the index i is less than the field P.NBR value, steps S14 to S16 are carried out. At steps S14 and S15, index i and the value of the field CPT of the frame at the address P.AD<i> (P.AD<i>.CPT) are incremented by 1. At step S16, the sequence T2 is called (recursive call) for the frame at the address P.AD<i> upon which the decoding of the frame P depends. The execution of the sequence is then continued at step S13. In other words, steps S13 to S16 allow the sequence T2 to be called for all the frames at addresses AD<i> (AD1-ADp) necessary for the decoding of the frame P, i.e., situated downstream of the frame P in the decoding dependency tree. When all the frames at addresses P.AD1 to P.ADp have been treated by the sequence T2, i.e., those having a field MB at a non 0 value, steps S17 to S19 are carried out. At steps S17 and S18, a variable MB and index i are initialized at 0. At step S19, index I is again compared to the field P.NBR value of the frame P. If index i is less than the value of field P.NBR, steps S20 to S22 are performed, otherwise steps S25 and S26 are performed. At step S20, index i is incremented by 1. At step S21, the variable MB is incremented by the value of field P.AD<i>.MB of the frame at the address P.AD<i>. At steps S22 and S23, if the variable MB is greater than the field P.MB value of the frame P, the field P.MB receives the variable MB value. The field P.MB thus contains the maximum number of frames to store to carry out the decoding of the frame P. Step S24 follows steps S23 and S22 if the variable MB is less than or equal to the field P.MB value. At step S24, the variable MB is decremented from the field MB value at the address P.AD<i> decreased by 1. Thus, once the frame at the address P.AD<i> is decoded, the fact that there is no longer a need to store the frames that served for the decoding of this frame is taken into consideration. At steps S19 to S24, the number of frames to store in order to decode each of the frames at addresses AD1-ADp necessary for the decoding of the frame P was taken into account. At step S25, the variable MB is incremented by 1 to include the frame P in the number of frames to store in order to decode frame P. At steps S26 and S27, if the variable MB is greater than the field P.MB value of the frame P, the field P.MB receives the variable MB value. The execution of the sequence T2 finishes at the end of step S26 or S27.

Figure 10:
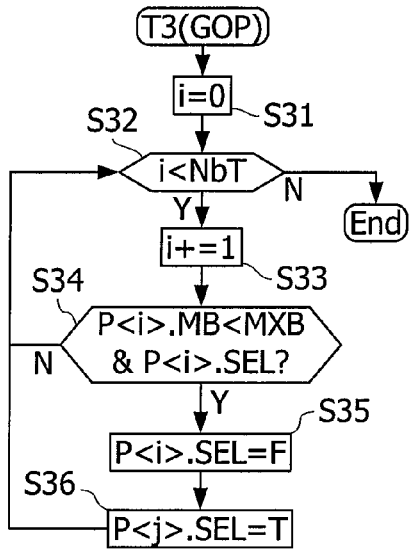

FIG. 10 shows a sequence of steps T3 executed by the module FFLT for a group of frames GOP. The sequence T3 allows to remove, if necessary, from the set of frames selected for display of group GOP, the frames of which the field MB value is greater than a maximum value MXB corresponding to the size of the memory available for the decoding of frames of the video sequence VST. The sequence T3 comprises steps S31 to S36. At step S31, an index i is initialized at 0. At step S32, the value of index i is compared with the number of frames NbT of the group of frames GOP. If index i is less than the number NbT, steps S33 and S34 are carried out, otherwise the sequence T3 ends. At step S33, index i is incremented by 1. At step S34, it is determined whether the frame P<i> of group GOP is selected for display (verification of the field P.SEL value), and if the field P<i>.MB value of the frame P<i> is greater than the maximum value MXB. If the frame P<i> is selected and if the field P<i>.MB value is greater than the value MXB, steps S35 and S36 are performed, otherwise the execution of the sequence is continued at step S32. Step S35 comprises no longer displaying the frame P<i> by changing the state of the field P<i>.SEL. Step S36 comprises searching among the frames closest to the frame P<i> for a frame P<j> (with j=i+/−1 or 2) of which the field MB is less than the maximum value MXB. If such a frame P<j> is found, the state of the field SEL of the found frame is changed so that the frame is displayed.

Figure 11:
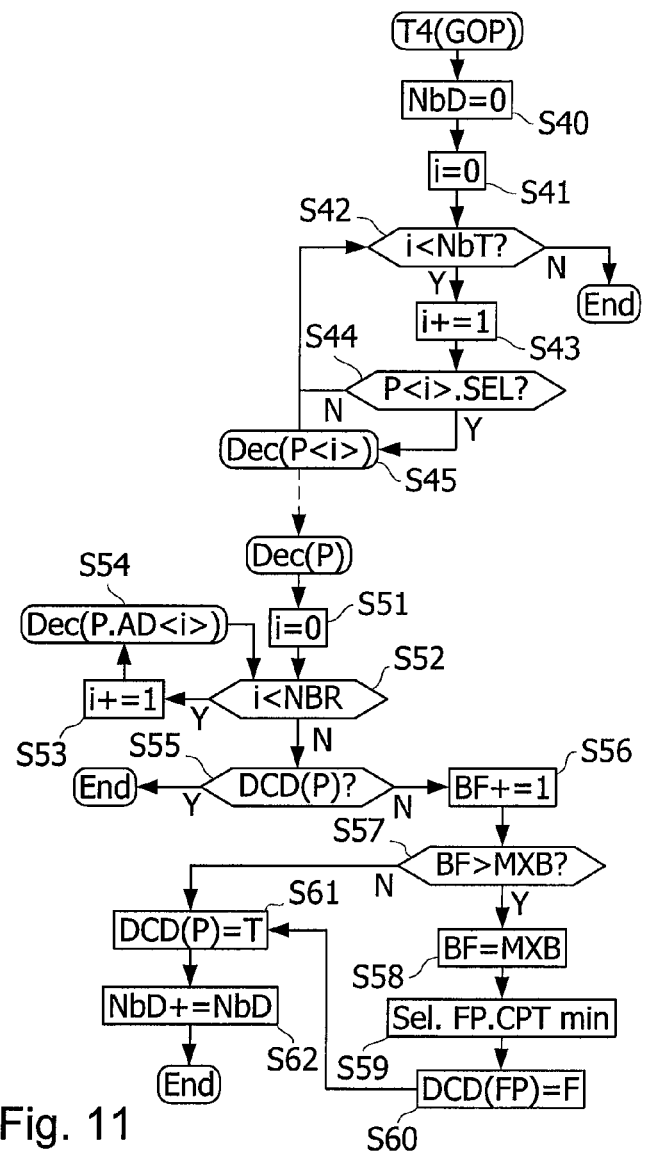

FIG. 11 shows a sequence of steps T4 executed for a group of frames GOP by the module FFLT. The sequence T4 allows for the determination of the number of frame decodings necessary for the decoding of frames selected to display of a group of frames GOP. The sequence T4 comprises steps S40 to S45. At steps S40 and S41, index i and a number of frame decodings NbD counter variable are initialized at 0. Steps S42 to S45 are carried out for each frame of the group GOP. At step S42, index i is compared to the number of frames NbT of the group of frames. If index i is greater than or equal to the number NbT, the sequence T4 is terminated, otherwise, index i is incremented by 1 (step S43). At steps S44 and S45, if the field P<i>.SEL of the frame P<i> indicates that the frame is selected for display, the module FFLT carries out a sequence Dec for the frame P<i>. The execution of the sequence T4 is then continued at step S42.

The sequence Dec performed for a frame P comprises steps S51 to S62. At step S51, an index i is initialized to 0. At steps S52 to S54, the sequence Dec is called (recursive call) for each of the frames at addresses P.AD1 to P.ADp, upon which the decoding of the frame P depends. Thus, at step S52, index i is compared to the field P.NBR value of the frame P. If index i is less than field P.NBR, index i is incremented by 1 at step S53 and the sequence Dec is called for the frame at address P.AD<i> (step S54). If at step S52 index i has reached the value P.NBR, step S55 is carried out. At step S55, if the frame is not already marked as decoded, steps S56 and S57 are carried out, otherwise the sequence Dec ends for the frame P. At step S56, a counter BF of the number of frames to store for the decoding of the group GOP is incremented by 1. At step S57, the value of the counter BF is compared to the maximum value MXB of frames susceptible of being temporarily stored. If the value of the counter BF has reached the maximum value MXB, steps S58 to S62 are carried out, otherwise only steps S61 and S62 are carried out.

At step S58, the counter BF receives the maximum value MXB. At step S59, a marked decoded and stored frame is selected from among the group of frames GOP that may be erased from the temporary memory. The selection of such a frame may be performed based on the value of the field CPT. Indeed, so as to penalize as little as possible the number of decodings to be done, a decoded frame of which the field CPT is at a minimum value may be selected, indicating that a minimum number of frames of the group GOP depend upon the selected frame for their decoding. The selected frame FP is marked non-decoded at step S60. At step S61, the frame P is marked decoded. At step S62, a number of decodings counter NbD is incremented by 1, and the sequence Dec ends for the frame P.

If the number of decodings NbD obtained for the group of frames GOP is greater than a maximum value, it may be decided to erase the frames selected for display first from among the B-type frames, then from among the P-type frames. If it is desired as a priority to reduce the impact of this frame suppression upon the uniformity of the distribution of frames selected in the group GOP, the B-type frames closest to a P- or I-type frame may be deleted first and replaced by the closest P-type if it is not already selected for display. Indeed, in most cases, the P-type frames are decoded even if they are not selected. If the number of supplementary frames to be erased so that the number of decodings NbD does not exceed the maximum value is known, the deleted frames may be distributed as uniformly as possible throughout the group GOP. If it is desired as a priority to reduce the impact of this suppression of frames upon the constancy of the frame display rate, the B-type frames may also be deleted first.

Each time that a frame to display of the group GOP is deleted (field P.SEL at false), the sequence of steps T4 may be again executed to re-evaluate the number of decodings NbD necessary for the decoding of the group GOP. Each time that a frame is deleted, the display duration DR of each selected frame is recalculated.

The module FFLT is configured to perform corrections of the display durations of selected frames and of the selection of frames so as to satisfy different criteria selected by the user, notably in relation to the regularity of the display duration of frames and to the regularity of the displaying of frames over time.

Figure 12A:
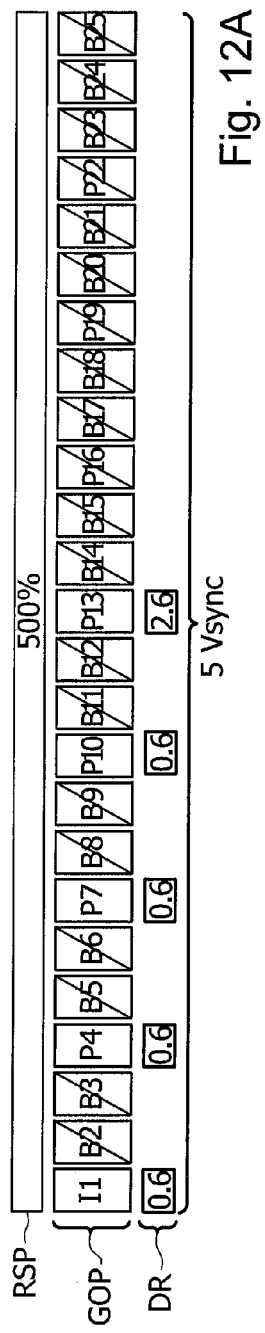
FIGS. 12A, 12B, 12C show video sequence frames at different treatment steps, to illustrate the functioning of a decoded video frame generation module, according to one embodiment.
Figure 12B:
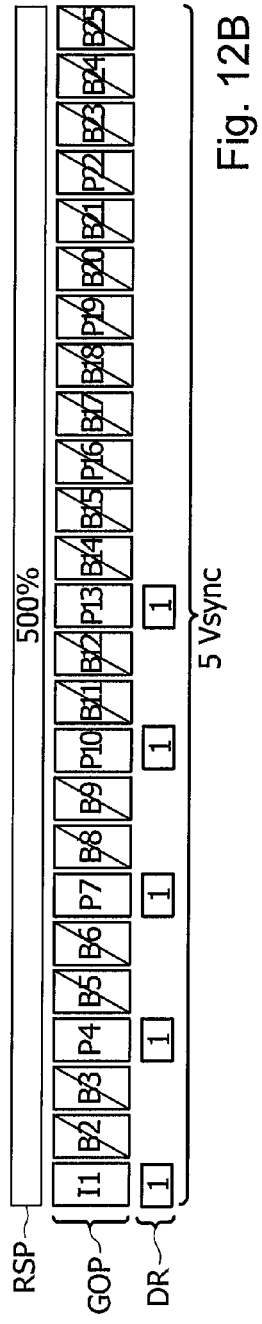
Figure 12C:
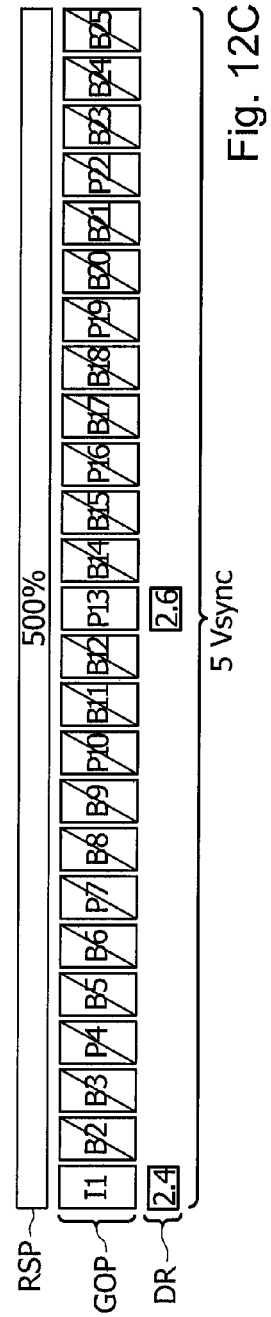

FIGS. 12A, 12B, 12C show a group of video frames GOP on output of the module FFLT. In the FIGS. 12A to 12C, the group of frames comprises 25 frames, numbered 1 to 25, comprising I-P- and B-type frames. The speed set point RSP has been fixed at 500%. The display duration attributed to each frame is thus equal to 0.2. As this speed is relatively high, the module SPCTL has ordered the module PRFL to select only the I- and P-type frames for playing. The module PRFL has therefore selected only the frames I1, P4, P7, P10, P13, P16, P19, and P22 and attributed to them a display duration of 0.6. Generally, the frames in the second half of a group of frames GOP use more decoded frames than the frames in the first half of the group GOP. FIG. 12A shows the case where the module FFLT has deleted the selected frames (frames P16, P19 and P22) due to an insufficient temporary memory capacity and/or treatment capacity. The module FFLT has therefore attributed a display duration equal to 2.6 to the last frame selected P13 of the group GOP. In FIG. 12A, the user has activated neither the frame display duration regularity criteria nor the frame temporal distribution regularity criteria, with the result that when the group of frames is played, a temporary pause on frame P13 can be perceived.

In FIG. 12B, the frame display duration regularity criteria has been activated. The module FFLT has therefore attributed a display duration of 1 to each of the selected frames I1, P4, P7, P10, and P13. As the second half of the group of frames GOP is not displayed, a jump in the movements of objects or of the scene filmed between frame P13 of a group GOP and the frame I1 of the following group of frames may be noticed during the playing of the group of frames.

In FIG. 12C, the frame temporal distribution regularity criteria has been activated. The frames P4, P7, and P10 have therefore been deleted from the frames selected for playing. Only the frames I1 and P13 have been conserved and a display duration of 2.4 has been attributed to the frame I1, and a display duration of 2.6 to the frame P13.

Obviously, when the playing speed of the video sequence is positive, the size of the memory allocated for the temporary storage of decoded frames may be sufficient. In this case, it may not be necessary to execute the sequences T2, T3, and T4. On the other hand, when the playing speed of the video sequence is negative, the execution of the sequences T2, T3, and T4 may be necessary.

It will clearly appear to the skilled person that the present disclosure is susceptible to numerous embodiment variations and diverse applications. In particular, embodiments of the disclosure may be performed simply by controlling the display of each frame as a function of the display duration associated thereto, as well as to the precedent frames in the video sequence, taking into consideration the sense of the playing (forwards or backwards) of the sequence. It is therefore not necessary to select beforehand the frames to play, notably when the playing speed set point is close to the nominal playing speed of the sequence.

It is also not necessary before the decoding of the frames of the sequence to verify whether the treatment and storage capacities available for the decoding are sufficient. Indeed, if these capacities turn out to be insufficient when the speed set point is taken into account, the decoding of a frame may be not performed.

In addition, the present disclosure does not necessarily apply only to video sequences of which the frames are coded with the aid of other frames. It may also apply to a video sequence of which the frames are coded independently of each other.

Some embodiments may take the form of or comprise computer program products. For example, according to one embodiment there is provided a computer readable medium comprising a computer program adapted to perform one or more of the methods or functions described above. The medium may be a non-transitory medium such as a physical storage medium, for example, a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., programmed by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    decoding frames of a compressed digital video sequence and playing the decoded frames as a function of a playing speed set point, by:
        attributing to each frame a display duration determined as a function of the playing speed set point; and
        at each period of a frame synchronization signal:
            if a display duration cumulative value is equal to or greater than a threshold value corresponding to the period of the synchronization signal, playing a previously acquired decoded frame and decreasing the display duration cumulative value; and
            if the display duration cumulative value is less than the threshold value, acquiring a new decoded frame and adding the display duration attributed to the newly acquired frame to the display duration cumulative value until the cumulative value is equal to or greater than the threshold value, playing a last decoded frame acquired, and decreasing the cumulative value of the threshold value.

2. The method of claim 1, further comprising, before decoding frames of the sequence, selecting video frames to play from among video frames of the video sequence as a function of the playing speed set point, and reevaluating the display duration attributed with each selected frame, as a function of the playing speed set point.

3. The method of claim 2 wherein the video sequence comprises independent frames, dependant reference frames, and dependant non-reference frames, wherein selecting video frames to play comprises selecting independent frames only or selecting independent frames and dependant reference frames only.

4. The method of claim 1 wherein the video sequence comprises groups of frames of identical structures, the method comprising analyzing the structure of the groups of frames of the video sequence, and removing a frame selected to play if decoding of the frame requires a temporary storage capacity greater than an available storage capacity.

5. The method of claim 1 wherein the video sequence comprises groups of frames of identical structures, the method comprising analyzing the structure of the groups of frames of the video sequence, and of removing a frame selected to play if the decoding of selected frames of a group of frames requires a treatment capacity greater than an available treatment capacity.

6. The method of claim 1 wherein the video sequence comprises groups of frames of identical structures, the method comprising evaluating a number of frames to store in order to decode a frame selected to play, and of suppressing the frame selected to play if decoding of the frame selected to play requires storage of a number of frames greater than an available storage capacity.

7. The method of claim 1 wherein the video sequence comprises groups of frames of identical structures, the method comprising evaluating a number of frame decodings to perform in order to decode frames selected to play of the group of frames, and of removing a frame selected to play if the number of decodings to perform to decode the frame selected to play is greater than a decoding treatment capacity.

8. The method of claim 1, comprising adjusting display durations attributed to frames selected to play to equalize frame display durations.

9. The method of claim 1 wherein the video sequence comprises groups of frames of identical structures, the method comprising removing frames from among frames selected to play of a group of frames, to equalize a temporal playing of frames selected to play.

10. A digital video player, comprising:
    a playing speed control module configured to generate signals to control a playing speed;
    a decoder configured to decode frames of a compressed digital video sequence; and
    a display control module, wherein the player is configured to
        attribute to each frame a display duration determined as a function of the playing speed set point; and
        at each period of a frame synchronization signal:
            if a display duration cumulative value is equal to or greater than a threshold value corresponding to the period of the synchronization signal, output a previously acquired decoded frame and decrease the display duration cumulative value; and
            if the display duration cumulative value is less than the threshold value:
                acquire new decoded frames and add the display duration attributed to the newly acquired frames to the display duration cumulative value until the cumulative value is equal to or greater than the threshold value;
                output a last decoded frame acquired; and
                decrease the cumulative value of the threshold value.

11. The digital video player of claim 10, further comprising:
    a filter coupled to an input of the decoder and configured to:
        select video frames to play from among video frames of the video sequence as a function of the playing speed set point.

12. The digital video player of claim 11 wherein the player is configured to reevaluate the display duration attributed with each selected frame, as a function of the playing speed set point.

13. The digital video player of claim 11 wherein the video sequence comprises independent frames, dependant reference frames, and dependant non-reference frames, and the filter is configured to select video frames to play from independent frames only or from independent frames and dependant reference frames only.

14. The digital video player of claim 11 wherein the video sequence comprises groups of frames of identical structures and the filter is configured to analyze the structure of the groups of frames of the video sequence and remove a frame selected to play if decoding of the frame requires a temporary storage capacity greater than an available storage capacity.

15. The digital video player of claim 11 wherein the video sequence comprises groups of frames of identical structures and the filter is configured to analyze the structure of the groups of frames of the video sequence and remove a frame selected to play if the decoding of selected frames of a group of frames requires a treatment capacity greater than an available treatment capacity.

16. The digital video player of claim 11 wherein the video sequence comprises groups of frames of identical structures and the filter is configured to evaluate a number of frames to store to decode a frame selected to play and suppress the frame selected to play if decoding of the frame selected to play requires storage of a number of frames greater than an available storage capacity.

17. The digital video player of claim 11 wherein the video sequence comprises groups of frames of identical structures and the filter is configured to evaluate a number of frame decodings to perform to decode frames selected to play of the group of frames and remove a frame selected to play if the number of frame decodings to perform to decode the frame selected to play is greater than a decoding treatment capacity.

18. The digital video player of claim 11 wherein the player is configured to adjust display durations attributed to frames selected to play to equalize frame display durations.

19. The digital video player of claim 11 wherein the video sequence comprises groups of frames of identical structures and the filter is configured to remove frames from among frames selected to play of a group of frames, to equalize a temporal playing of frames selected to play.

20. A system, comprising:
means for decoding frames of a compressed digital video sequence;
means for attributing to frames a display duration based on a playing speed set point; and
means for, at each period of a frame synchronization signal:
if a display duration cumulative value is equal to or greater than a threshold value corresponding to the period of the synchronization signal, outputting a previously acquired decoded frame and decreasing the display duration cumulative value; and
if the display duration cumulative value is less than the threshold value:
acquiring new decoded frames and adding the display duration attributed to the newly acquired frames to the display duration cumulative value until the cumulative value is equal to or greater than the threshold value;
outputting a last decoded frame acquired; and
decreasing the cumulative value of the threshold value.

21. The system of claim 20, further comprising:
means for selecting video frames to play from among video frames of the video sequence as a function of the playing speed set point.

22. The system of claim 21, further comprising:
means for reevaluating the display duration attributed with each selected frame, as a function of the playing speed set point.

23. The system of claim 21 wherein the video sequence comprises independent frames, dependant reference frames, and dependant non-reference frames, and the means for selecting is configured to select video frames to play from independent frames only or from independent frames and dependant reference frames only.

24. The system of claim 21 wherein the video sequence comprises groups of frames of identical structures, further comprising:
means for analyzing the structure of the groups of frames of the video sequence and selectively removing a frame selected to play.

25. The system of claim 21, further comprising:
means for adjusting display durations attributed to frames selected to play to equalize frame display durations.

26. The system of claim 20, further comprising:
means for playing decoded video sequences.

27. A non-transitory computer readable medium whose contents cause at least one processing device to perform a method, the method comprising:
decoding frames of a compressed digital video sequence;
attributing to frames a display duration based on a playing speed set point; and,
at each period of a frame synchronization signal:
if a display duration cumulative value is equal to or greater than a threshold value corresponding to the period of the synchronization signal, outputting a previously acquired decoded frame and decreasing the display duration cumulative value; and
if the display duration cumulative value is less than the threshold value:
acquiring new decoded frames and adding the display duration attributed to the newly acquired frames to the display duration cumulative value until the cumulative value is equal to or greater than the threshold value;
outputting a last decoded frame acquired; and
decreasing the cumulative value of the threshold value.

28. The non-transitory computer readable medium of claim 27 wherein the method further comprises:
selecting video frames to play from among video frames of the video sequence as a function of the playing speed set point.

29. The non-transitory computer readable medium of claim 28 wherein the method further comprises:
reevaluating the display duration attributed with each selected frame, as a function of the playing speed set point.

30. The non-transitory computer readable medium of claim 28 wherein the video sequence comprises independent frames, dependant reference frames, and dependant non-reference frames and the selecting comprises selecting video frames to play from independent frames only or from independent frames and dependant reference frames only.

31. The non-transitory computer readable medium of claim 28 wherein the video sequence comprises groups of frames of identical structures, the method further comprises:
analyzing the structure of the groups of frames of the video sequence and selectively removing a frame selected to play based on the analysis.

32. The non-transitory computer readable medium of claim 28, the method further comprising:
adjusting display durations attributed to frames selected to play to equalize frame display durations.

* * * * *